3,632,759
INSECTICIDAL COMPOSITIONS AND METHOD
OF MAKING SAME
Richard A. Jameston, Excelsior, and James C. Mickus, Bloomington, Minn., assignors to Cargill, Incorporated, Minneapolis, Minn.
No Drawing. Filed May 16, 1969, Ser. No. 825,418
Int. Cl. A01n 9/20
U.S. Cl. 424—300      8 Claims

ABSTRACT OF THE DISCLOSURE

A dispersion of a powdered insecticide in an aqueous sugar syrup stabilized against fermentation, separation and agglomeration by addition of an acid to adjust the pH of the dispersion to within the range of between about 3 and about 4.

---

This invention relates generally to insecticides and more particularly relates to pumpable insecticidal dispersions containing sugar which retard separation and agglomeration and which resist fermentation.

Spraying of insecticides onto plants for controlling the growth of insects thereon is well-known. The insecticide may be dissolved or dispersed in a fluid, or may be a powder. For large scale application, for example by airplane, fluid insecticides are generally preferable. Various insects have developed tolerance to some insecticides which can be dissolved in water and it is sometimes necessary to use an insecticide which is available only in a powdered form. For example, *Heliothis zea*, which is sometimes referred to as *Heliothis armigera*, commonly known, depending on the crop species it attacks, as cotton bollworm, corn earworm, tomato fruitworm or soybean podworm, is resistant to many commercially available liquid insecticides. This insect, however, may be controlled by the use of a powdered insecticide, such as 1-naphthyl methyl carbamate.

The use of powdered insecticides, however, offers considerable problems to the grower. If used in dry form there are considerable dusting problems. If dispsersed in a liquid carrier, the dispersion tend to be unstable with respect to separation and agglomeration, causing uneven distribution of the powdered insecticide over the field. In addition, the unstable dispersion tends to cause plugging of screens and nozzles in the spray equipment.

Recent efforts at using powdered insecticides have been directed at combining the powdered insecticide with a carrier that provides additional advantageous functions. For example, 1-naphthyl methyl carbamate has been combined with diluted molasses for use in spraying cotton to control bollworm. The molasses provides advantageous secondary functions. It acts first as a means for causing the insecticide to adhere to the cotton plants so that the insecticide is accessible to the bollworm for a longer period of time. This is particularly advantageous with an insecticide such as 1-naphthyl methyl carbamate which has a relatively long useful life. Secondly, the sugar of the molasses acts as an attractant for the insect so that higher levels of the insecticide are consumed by the bollworm and higher kills are obtained.

However, the combining or mixing of a powdered insecticide with molasses provides considerable problems for the grower. Sophisticated mixing equipment, which is not usually found on the farm, is required to provide a homogeneous blend. Also, the mixture of the powdered insecticide and the molasses must be used immediately after mixing to prevent settling and separation. Even if re-mixing of the mixture of powdered insecticide and molasses is considered feasible immediately prior to use of the mixture, any extended period of storage results in fermentation of mixture and extensive agglomeration which cannot be redispersed by simple mixing.

Accordingly, it is an object of the invention to provide a pumpable blend of powdered insecticide and a carrier which is resistant to settling and separation. It is another object of the invention to provide a pumpable blend of a powdered insecticide and a carrier resistant to fermentation over extended periods of time. It is a further object of the present invention to provide a homogeneous dispersion of a powdered insecticide and a syrup, such as molasses, which is resistant to separation, agglomeration and fermentation.

These and other objects of the invention will become more apparent from the following detailed description.

In general, we have found that a dispersion of a powdered insecticide in an aqueous sugar containing syrup may be stabilized against fermentation and separation by addition to the dispersion of an acid or acid mixture at a level sufficient to adjust the pH of the dispersion to within the range of between about 3 to about 4.

The insecticidal composition of the present invention is particularly suitable for the treatment of bollworms found in cotton. As previously indicated, the powdered insecticide, 1-naphthyl methyl carbamate, is particularly suitable for the treatment of bollworms. 1-naphthyl methyl carbamate is frequently referred to as a carbaryl insecticide, and is available under the trade name Sevin. Other powdered insecticides are available under various trade names, for the control of insects and larvae.

Carbaryl insecticides are available in various strengths, and are generally sold in combination with an inert filler, such as diatomaceous earth, and with various wetting and dispersing agents, for example polyoxyalkylene materials, which aid in establishing a stable dispersion of the insecticides.

Any aqueous syrup containing mono and dissccharides may be utilized as the dispersing medium. The syrup may be prepared by combining various sacchariferous materials with water or may be a sugar base product such as molasses. Any available molasses such as beet, cane, citrus or wood molasses may be used.

In a preferred embodiment of the present invention, the aqueous syrup is molasses. The solids content of molasses is principally sugar, protein and ash. It has been found that for best results the total sugar, measured as invert sugar (TSI) is between about 40 and about 70 percent by weight, the protein is between about 1 and about 5 percent by weight and the ash content is not more than about 10 percent by weight when the molasses is standardized at a Brix of about 79.5.

When molasses at a Brix of 79.5 contains more than about 5 percent by weight protein, the molasses insecticide dispersion is susceptible to gelling, particularly at elevated temperatures. It is preferred, however, that protein be present at a level of at least about 1 percent by weight, to provide desired thickening. It is contemplated that other hydrocolloids, such as gums, cellulose derivatives, synthetic thickening agents and the like may be used in place of the protein, particularly where the syrup is low in protein, for example corn syrup, hydrol or aqueous sucrose solutions.

The acid used in providing the desired level of pH in compositions of the invention may be any inorganic acid or organic acid or mixtures thereof which are sufficiently strong acids to provide the desired pH level. The acid may be supplied in a concentrated or dilute liquid form, or may be in a dry powdered form. In this connection, suitable inorganic acids are hydrochloric acid, sulphuric acid, phosphoric acid, polyphosphoric acid and sulfamic acid.

Suitable organic acids are acetic acid, chloroacetic acid, glycolic acid and diglycolic acid. Other suitable acids will be readily apparent to those skilled in the art. In general, it is preferred to use strong mineral acids. Organic acids generally tend to increase the viscosity of the composition and for this reason are considered less desirable. However, the combination of an inorganic acid, such as sulphuric acid, with an organic acid, such as glycolic acid, may provide certain additional desirable features, such as reduced gelation tendencies.

As previously indicated, the acid is added to the syrup insecticide dispersion at a level sufficient to provide a pH in the range of between about 3 and about 4. At pH levels of less than about 3, the dispersion shows some tendency to separate upon storage at elevated temperatures, for example of about 100° F. or above. At a pH of above about 4, the insecticide dispersion does not resist fermentation for appreciable periods of time, i.e., greater than about seven days.

The initial viscosity of the dispersion is preferably reduced to below about 7,000 centipoises, preferably below about 5,000 centipoises, to provide a dispersion which may be readily handled using conventional pumping equipment. The initial viscosity may be obtained by any suitable means, such as by addition of water, a surfactant, or an organic diluent to the dispersion during manufacture, or by the use of low Brix molasses. The viscosity of the dispersion may increase slightly during storage, but it has been found that the viscosity of the described dispersions do not increase greatly, even after prolonged storage.

It is desirable to provide the powdered insecticide at as high a level as possible in the dispersion. The dispersion may then be shipped to a desired location and diluted with water by simple stirring to provide the desired level of insecticide for the application intended. In this connection, the powdered insecticide which may include a carrier and a dispersing agent may be provided in the dispersion at levels of up to about 35 percent by weight of the dispersion. For ease of pumping and handling the powdered insecticide concentration is preferably below about 30 percent by weight of the dispersion.

The stability of the insecticide dispersion may be measured in terms of the resistant of the composition to gelling, separation into layers, agglomeration of the insecticide particles in suspension, and fermentation.

The following examples illustrate various features of the invention, but are intended to in no way limit the scope of the invention, which is defined in the appended claims.

EXAMPLE I

Insecticide compositions were prepared in accordance with the present invention. In preparing the composition, molasses having an initial Brix of 79.5, a TSI of 51.2 percent, a protein content of between 2 and 4 percent by weight and less than 10 percent by weight ash, was used. The compositions were prepared by placing the molasses in a kettle equipped with a high speed propeller type mixer. Water was then added along with quantities of various acids to provide a pH in the range of 3–4 and an initial viscosity below 7,000 centipoises. The powdered insecticide was then added into the vortex generated by the mixer. Mixing was continued until a homogeneous dispersion of the powdered insecticide in the molasses was obtained.

TABLE 1.—FORMULATIONS

| Ingredient, percent by weight: | Sample Number | | | | | | | | |
|---|---|---|---|---|---|---|---|---|---|
| | 1 | 2 | 3 | 4 | 5 | 6 | 7 | 8 | Control |
| Molasses | 70.6 | 70.6 | 70.6 | 70.6 | 70.6 | 70.6 | 70.6 | 70.6 | 70.6 |
| Powdered insecticide [1] | 18.2 | 18.2 | 18.2 | 18.2 | 18.2 | 18.2 | 18.2 | 18.2 | 18.2 |
| Water | 10.4 | 9.6 | 9.6 | 8.0 | 5.6 | | 8.0 | | 11.2 |
| $H_2SO_4$ (conc.) | 0.8 | 1.6 | | | | | | | |
| HCl (conc.) | | | 1.6 | 3.2 | | | | | |
| Glacial acetic acid | | | | | 5.6 | 11.2 | | | |
| Glycolic acid (70%) | | | | | | | 3.2 | 11.2 | |
| Initial pH | 4.0 | 3.2 | 3.9 | 3.1 | 3.8 | 3.5 | 3.8 | 3.0 | 5.2 |
| Initial viscosity at 78° F. (centipoises) | 1,550 | 1,975 | 1,375 | 1,450 | 3,025 | 6,500 | 2,000 | 3,975 | 1,425 |

[1] Sevin 80S, trade name for 80 percent active 1-napthyl methyl carbamate manufactured by Union Carbide Co.

Eight samples were prepared as indicated in Table 1. A control sample containing no acid was also prepared.

Each of the samples from Table 1 were examined after being stored for 75 days at temperatures of 78° F. and 100° F. The samples were examined with respect to gelling, separation, agglomeration and fermentation tendencies, and the results are reported below in Table 2. The separation characteristics were judged by the appearance of an interface in the sample. As indicated in Table 2, the appearance of the interface is described by a fraction such as 5/100.

This indicates that a separation occurred in which the separated layer is 5 parts out of a total height of 100 parts.

TABLE 2.—SUSPENSION STABILITY

| Table 1 sample No.: | Gelling | | Separating | | Agglomeration | | Fermentation | |
|---|---|---|---|---|---|---|---|---|
| | 78° F. | 100° F. | 78° F. | 100° F. | 78° F. | 100° F. | 78° F. | 100° F. |
| 1 | None | None | None | None | None | Slight grainy appearance. | None | None. |
| 2 | do | do | 5/100 | 2/100 | do | None | do | Do. |
| 3 | do | do | 5/100 | 5/100 | do | do | do | Do. |
| 4 | do | do | 3/100 | [2] | do | do | do | Do. |
| 5 | do | do | 5/100 | 8/100 | do | do | do | Do. |
| 6 | do | do | 6/100 | 10/100 | Grainy | Grainy | do | Do. |
| 7 | do | do | 4/100 | 5/100 | Very small agglomerates. | Very small agglomerates. | do | Do. |
| 8 | do | Gel formed | None | 15/100 | Slight graininess | Large agglomerates at base of sample. | do | Do. |
| Control | do | None | [1] | | do | Slight graininess | Yes, within 1 week | Yes, within 1 week. |

[1] Various stratified layers of molasses/insecticide/molasses.
[2] Very slight.

As can be seen from the foregoing tables, the insecticide dispersions of the present invention are stable with respect to gelling, separation, agglomeration and fermentation. Each of the dispersions remain pumpable at ambient temperatures. The control sample containing no acid exhibited unacceptable separation upon storage and fermentation occurred within one week.

EXAMPLE II

Insecticidal compositions were prepared in accordance with the procedure of Example I. The insecticidal compositions contained concentrated sulphuric acid and glycolic acid in the proportions set forth below in Table 3 to provide a pH of 3.6. Five samples were prepared which are designated in Table 3 by the Sample Numbers 9 through 13 inclusive.

TABLE 3

| | Sample No. | | | | |
|---|---|---|---|---|---|
| | 9 | 10 | 11 | 12 | 13 |
| Ingredients, weight in grams: | | | | | |
| Molasses | 1,560 | 1,560 | 1,560 | 1,560 | 1,560 |
| Powdered insecticide [1] | 608 | 608 | 608 | 608 | 608 |
| 70% glycolic acid | | 31.3 | 19.4 | 11.7 | 81.0 |
| Conc. $H_2SO_4$ | 32 | 15.5 | 19.4 | 23.5 | |
| Water | 340 | 325.2 | 333.2 | 336.0 | 291 |
| Initial viscosity at 78° F. (centipoises) | 2,800 | 2,700 | 2,200 | 2,600 | 2,350 |
| Viscosity after storage at 78° F. for 60 days | 4,600 | 3,800 | 3,500 | 3,800 | 3,900 |

[1] Sevin 80S, trade name for 80 percent active 1-naphthyl methyl carbamate, manufactured by Union Carbide Co.

The samples from Table 3 were examined after being stored 60 days at a temperature of 78° F. The viscosity of the samples were determined and this viscosity is reported in Table 3. As can be seen by examining the initial viscosity of the samples and the viscosity after storage for 60 days, the use of a combination of sulphuric acid and glycolic acid produces insecticidal compositions with stable viscosity over extended periods of storage.

The samples were also inspected with respect to gelling, separation, agglomeration and fermentation tendencies. The separation characteristics were judged as described in Example I. The results are reported below in Table 4.

As can be seen from the foregoing tables, the insecticide dispersions of the present invention are stable with respect to gelling, separation, agglomeration and fermentation. The viscosity remains stable and relatively unchanged over extended periods of storage and the dispersions remain pumpable at ambient temperature.

What is claimed is:

1. A pumpable insecticidal dispersion comprising a mixture of 1-napthyl methyl carbamate, a syrup and an acid, said syrup having a sugar content, measured as invert sugar, of between about 40 and about 70 percent by weight when the Brix of said syrup is adjusted to 79.5, said acid being present at a level sufficient to provide a pH in said composition of from about 3 to about 4, said mixture having an initial viscosity at the time of preparation of less than about 7,000 centipoises.

2. A pumpable insecticidal dispersion in accordance with claim 1 wherein the syrup is molasses.

3. A pumpable insecticidal dispersion in accordance with claim 2 wherein the molasses has a protein content of between about 1 and about 5 percent by weight.

4. A pumpable insecticidal dispersion in accordance with claim 2 wherein the molasses has an ash content of less than about 10 percent by weight.

5. A method for preparing a stable, pumpable insecticidal dispersion comprising providing a syrup having a sugar content, measured as invert sugar, of between about 40 and 70 percent by weight when the Brix of said syrup is adjusted to 79.5, dispersing 1-napthyl methyl carbamate in said syrup, adjusting the pH of the dispersion to a level of from about 3 to about 4, and adjusting the initial viscosity of the dispersion at the time of preparation to less than about 7,000 centipoises.

6. A method in accordance with claim 5 wherein the syrup is molasses.

7. A method in accordance with claim 6 wherein the molasses contains protein at a level of between about 1 and about 5 percent by weight.

8. A method in accordance with claim 6 wherein the molasses has an ash content of less than about 10 percent by weight.

TABLE 4.—DISPERSION STABILITY AFTER 60 DAYS STORAGE

| | Gelling | | Separation | | Agglomeration | | Fermentation | |
|---|---|---|---|---|---|---|---|---|
| Sample | 78° F. | 100° F. | 78° F. | 100° F. | 78° F. | 100° F. | 78° F. | 100° F. |
| 9 | None | None | Very slight | Very slight | None | None | None | None |
| 10 | do | do | do | do | do | do | do | Do. |
| 11 | do | do | do | do | do | do | do | Do. |
| 12 | do | do | do | do | do | do | do | Do. |
| 13 | do | Slight | do | do | do | do | do | Do. |

References Cited

UNITED STATES PATENTS 3,162,575   12/1964   Lang _____ 424—361

SAM ROSEN, Primary Examiner

U.S. Cl. X.R.

424—361